United States Patent
Torrealba et al.

(10) Patent No.: US 11,492,882 B2
(45) Date of Patent: Nov. 8, 2022

(54) OIL RESERVOIR CONFORMANCE IMPROVEMENT SYSTEM AND METHOD

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Victor Antonio Torrealba, Thuwal (SA); Hussein Hoteit, Thuwal (SA); Ahmad Alabdulghani, Thuwal (SA)

(73) Assignees: KING ABDULLAH UNIVERSITY OF SCIENCE AND TECHNOLOGY, Thuwal (SA); SAUDI ARABIAN OIL COMPANY, Dhahran (SA)

(*) Notice: Subject to any disclaimer, the term of this patent is extended or adjusted under 35 U.S.C. 154(b) by 42 days.

(21) Appl. No.: 16/769,717

(22) PCT Filed: Dec. 11, 2018

(86) PCT No.: PCT/IB2018/059881
§ 371 (c)(1),
(2) Date: Jun. 4, 2020

(87) PCT Pub. No.: WO2019/123107
PCT Pub. Date: Jun. 27, 2019

(65) Prior Publication Data
US 2021/0172302 A1    Jun. 10, 2021

Related U.S. Application Data

(60) Provisional application No. 62/646,635, filed on Mar. 22, 2018, provisional application No. 62/607,433, filed on Dec. 19, 2017.

(51) Int. Cl.
*E21B 43/20* (2006.01)
*C09K 8/584* (2006.01)

(52) U.S. Cl.
CPC .............. *E21B 43/20* (2013.01); *C09K 8/584* (2013.01)

(58) Field of Classification Search
None
See application file for complete search history.

(56) References Cited

U.S. PATENT DOCUMENTS 3,500,922 A    3/1970   O'brien et al.
4,455,255 A    6/1984   Stapp
(Continued)

OTHER PUBLICATIONS

Bennett, K.E., et al., "Microemulsion Rheology: Newtonian and Non-Newtonian Regimes," Society of Petroleum Engineers of AIME, SPE 10061, October 5-7, 2918, 13 pages.
(Continued)

*Primary Examiner* — Charles R Nold
(74) *Attorney, Agent, or Firm* — Patent Portfolio Builders PLLC

(57) ABSTRACT

A conformance improvement method involves injecting, via an injection well, a first water slug into a subsurface reservoir. A second water slug is injected, via the injection well, into the subsurface reservoir. The first and second water slugs have different viscosities, at least one of the first and second water slugs includes a surfactant, and the first and second water slugs combine with oil in the subsurface reservoir to form a microemulsion in a layer of the subsurface reservoir. A fluid is injected, via the injection well, into the subsurface reservoir. Oil is collected, via a production well, from the subsurface reservoir. The injected fluid causes the oil to move into the production well.

9 Claims, 6 Drawing Sheets

(56) References Cited

U.S. PATENT DOCUMENTS

| | | | |
|---|---|---|---|
| 4,458,760 A | 7/1984 | Hurd | |
| 4,741,399 A | 5/1988 | Hurd et al. | |
| 4,745,976 A | 5/1988 | Harwell et al. | |
| 2018/0002591 A1* | 1/2018 | Southwick | E21B 43/16 |
| 2019/0093469 A1* | 3/2019 | Williams | E21B 49/00 |

OTHER PUBLICATIONS

Christie, M.A., et al., "Tenth SPE Comparative Solution Project: A Comparison of Upscaling Techniques," SPE Reservior Evaluation & Engineering, Aug. 2001, pp. 308-317.
International Search Report in corresponding/related International Application No. PCT/IB2018/059881, dated Mar. 19, 2019.
Labrid, J.C., "Oil Displacement Mechanism by Winsor's Type I Micellar Systems," Society of Petroleum Engineers of AIME, SPE 8325, Sep. 23-26, 1979, 16 pages.
Written Opinion of the International Searching Authority in corresponding/related International Application No. PCT/IB2018/059881, dated Mar. 19, 2019.

* cited by examiner

OIL RESERVOIR CONFORMANCE IMPROVEMENT SYSTEM AND METHOD

CROSS-REFERENCE TO RELATED APPLICATIONS

This application is a U.S. National Stage Application of International Application No. PCT/IB2018/059881, filed on Dec. 11, 2018, which claims priority to U.S. Provisional Patent Application No. 62/607,433, filed on Dec. 19, 2017, entitled "METHOD TO USE PULSE SLUGS OF SURFACTANTS AT DIFFERENT CONCENTRATIONS FOR RESERVOIR CONFORMANCE IMPROVEMENT," and U.S. Provisional Patent Application No. 62/646,635, filed on Mar. 22, 2018, entitled "OIL RESERVOIR CONFORMANCE IMPROVEMENT SYSTEM AND METHOD," the disclosures of which are incorporated herein by reference in their entirety.

BACKGROUND

Technical Field

Embodiments of the disclosed subject matter generally relate to a system and method for oil reservoir conformance improvement by injecting water slugs, having different surfactant concentrations or different surfactant concentrations and salinities, into a subsurface reservoir.

Discussion of the Background

Oil production involves extraction of oil from subsurface reservoirs. To increase the amount of extracted oil, some oil production arrangements include an injection well arranged on one side of a subsurface reservoir and a production well arranged on the other side of the subsurface reservoir. FIG. 1 is a schematic diagram of such an arrangement. In this arrangement, a fluid, such as water, is typically injected into the injection well 102, which generates a flood front 104 in the subsurface reservoir 106 that moves the oil towards the production well 108 where the oil is extracted.

Oil recovery from subsurface reservoirs is typically expressed as a product of displacement efficiency (i.e., the ratio of displaced to contacted volumes) and sweep efficiencies (i.e., the ratio of contacted to in place volumes). Reservoir conformance is a measure of volumetric sweep efficiency during the oil recovery process, which typically represents the uniformity of the flood front 104. A reservoir having relatively homogenous layers will have a good conformance measure because the flood front will propagate relatively uniformly through the homogenous layers. However, a reservoir having heterogeneous layers will have some layers having low permeability and others having high permeability, which results in low conformance measurements. For example, the subsurface reservoir in FIG. 1 has layers 110 and 112 having a relatively low permeability surrounding a layer 114 having a relatively high permeability. In this case, as illustrated in FIG. 1, the flood front 104 will propagate much quicker through the high permeability layer 114 (104A designating the flood front in the high permeability layer) than the low permeability layers 110 and 112 (104B and 104C denoting the flood front in the low permeability layers 110 and 112, respectively), which results in more water entering the production well 108.

Conformance improvement is a general term for techniques used to increase the amount of oil and decrease the amount of water entering the production well. One conventional conformance improvement technique involves injection of polymers into a subsurface reservoir, which tended to flow into high permeability zones so that a subsequent injection of water was diverted towards unswept regions of the reservoir, and thus decreasing the overall water-to-oil ratio at the production well. Polymers, however, are disadvantageous because they cause irreversible permeability reduction from polymer/rock interactions and can become unstable (i.e., degrade) due to sensitivity to reservoir temperature and concentration of total dissolved solids in water.

Another conventional conformance improvement technique involves the use of foam, which involves the interaction of a surfactant, a gas (e.g., $CO_2$ and $N_2$), and water to form foam in situ in the reservoir. The ability to form foam by interaction of the surfactant, gas, and water in situ in the reservoir is advantageous because the individual components have a lower viscosity compared to the formed foam, and thus are able to propagate into the high permeability zones. Foams, like polymers, exhibit stability issues in the presence of oil, which requires the injection process to be frequently repeated to maintain the conformance improvement.

Thus, it would be desirable to provide systems and methods for oil reservoir conformance improvement that can form in place within the subsurface reservoir while being relatively stable over the time under the natural conditions existing in the subsurface reservoir.

SUMMARY

According to an embodiment, there is method, which comprises injecting, via an injection well, a first water slug into a subsurface reservoir; injecting, via the injection well, a second water slug into the subsurface reservoir, wherein the first and second water slugs have different viscosities, at least one of the first and second water slugs includes a surfactant, and the first and second water slugs combine with oil in the subsurface reservoir to form a microemulsion in a layer of the subsurface reservoir; injecting, via the injection well, a fluid into the subsurface reservoir; and collecting, via a production well, oil from the subsurface reservoir, wherein the injected fluid causes the oil to move into the production well.

According to another embodiment, there is a system, which comprises a pump coupled a subsurface reservoir via an injection well; and a controller coupled to the pump. The controller is configured to control the pump to inject, via the injection well, a first water slug into the subsurface reservoir; inject, via the injection well, a second water slug into the subsurface reservoir, wherein the first and second water slugs have different viscosities, at least one of the first and second water slugs includes a surfactant, and the first and second water slugs combine with oil in the subsurface reservoir to form a microemulsion in a layer of the subsurface reservoir; and inject, via the injection well, a fluid into the subsurface reservoir.

According to a further embodiment, there is a method, which comprises performing a plurality of water slug injection cycles, each cycle comprising injecting at least two water slugs into a subsurface reservoir via an injection well, wherein at least one of the at least two water slugs includes a surfactant and the at least two water slugs of each cycle combine with oil in the subsurface reservoir to form a microemulsion in a layer of the subsurface reservoir; injecting, via the injection well, a fluid into the subsurface reservoir; and collecting via a production well, oil from the subsurface reservoir, wherein the injected fluid causes the oil to move into the production well.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of oil reservoir conformance improvement.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
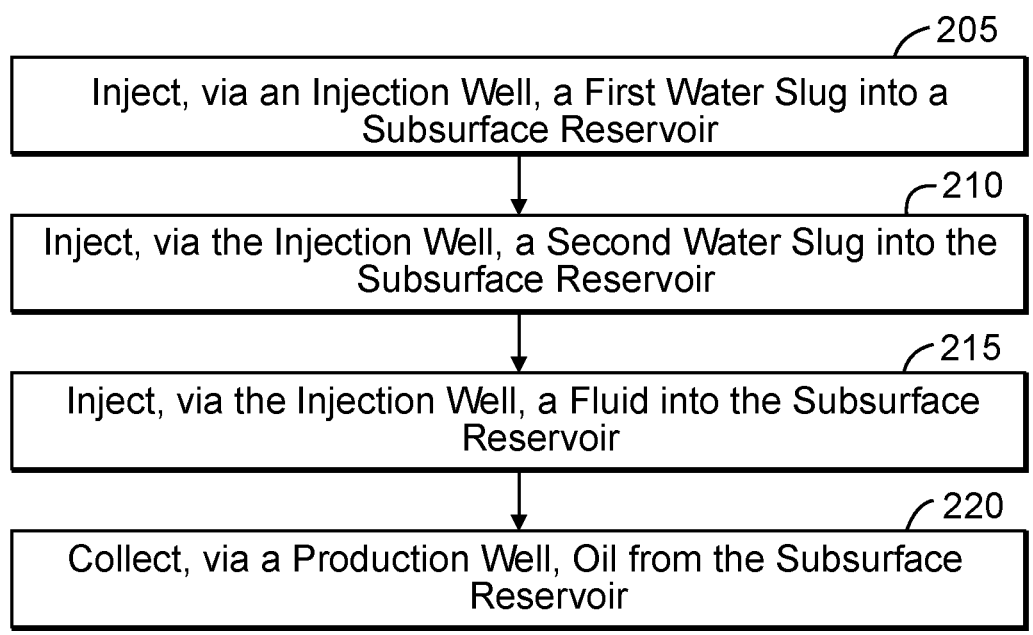
FIG. 2 is a flowchart of a method of conformance improvement according to an embodiment.

A method for conformance improvement according to an embodiment will now be described in connection with the flowchart of FIG. 2. Initially, a first water slug is injected, via an injection well, into a subsurface reservoir (step 205). A second water slug is then injected into the subsurface reservoir via the injection well (step 210). The first and second water slugs have different viscosities, at least one of the first and second water slugs includes a surfactant, and the first and second water slugs combine with oil in the subsurface reservoir to form a microemulsion in a layer of the subsurface reservoir. A fluid, such as water, is then injected into the injection well (step 215) and oil is collected from the subsurface reservoir via a production well (step 220).

The different viscosities of the first and second water slugs can be achieved by varying the concentration of the surfactant in each water slug while holding the salinity (note that the salinity may be zero in one application) of the water slugs constant or by varying the concentration of the salinity of the water slugs while holding the concentration of the surfactant in the water slugs constant, or by varying the concentration of both the salinity and surfactant in the water slugs. The concentration of a water slug can be adjusted by adjusting the ratio of water to surfactant in the water slug. As will be described below, in some embodiments the concentration of the surfactant in one of the water slugs can be zero surfactant.

Figure 3:
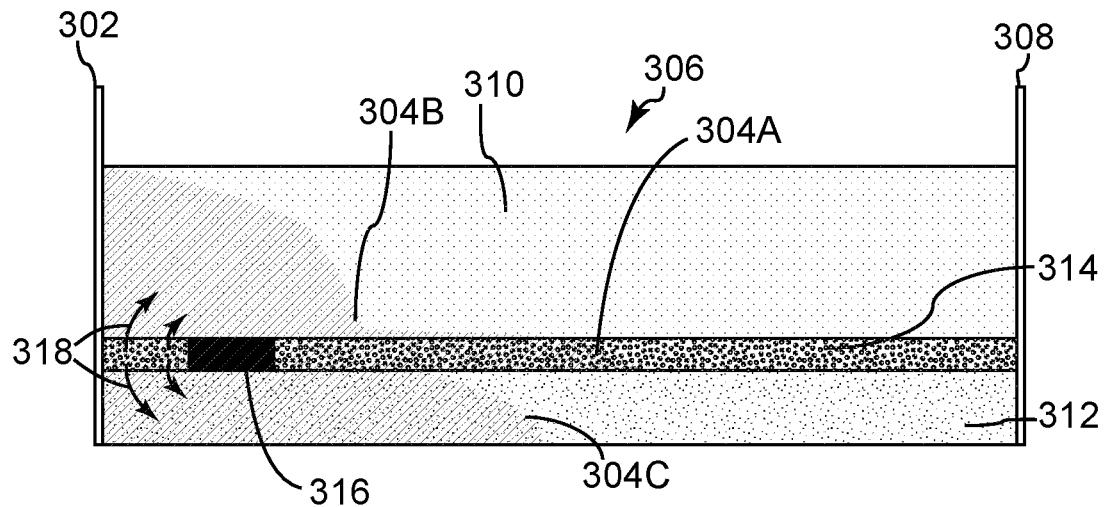
FIG. 3 is a schematic diagram of a subsurface reservoir with the disclosed conformance improvement according to an embodiment.

Referring now to FIG. 3, which is a schematic diagram of a subsurface reservoir with the disclosed conformance improvement according to an embodiment, the combination of the first and second water slugs forms a microemulsion 316 in a portion of the high permeability layer 314. This creates a cross-flow 318, which causes the injected water to move around the microemulsion 316 and slows the movement of the flood front passing through the high permeability layer by diverting the water into the low permeability layers 310 and 312.

Figure 1:
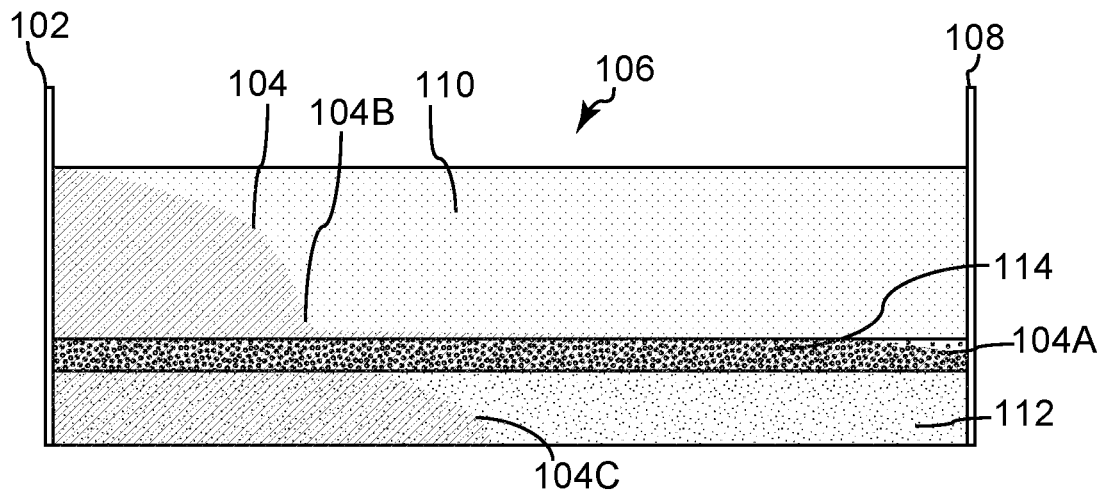
FIG. 1 is a schematic diagram of a conventional subsurface reservoir without any conformance improvement.

The advantages of the disclosed conformance improvement can be seen by comparing the flood fronts of the reservoir 106 without conformance improvements in FIG. 1 and the reservoir 306 with the disclosed conformance improvement in FIG. 3. Specifically, the portions 304A, 304B, and 304C of flood front 304 in FIG. 3 are relatively more uniform compared to the portions 104A, 1048, and 104C of flood front 104 in FIG. 1. The portion 304A of flood front 304 is closer to the portions 304B and 304C of flood front 304 than to the production well 308, whereas the portion 104A of flood front 104 is closer to the production well 108 than to the portions 1048 and 104C of flood front 104. The more uniform portions 304A, 304B, and 304C of the flood front 304 reduce the water cut (i.e., the water volume to total extracted fluid volume) compared a reservoir without the disclosed performance improvement, the details of which will be addressed below.

Figure 4A:
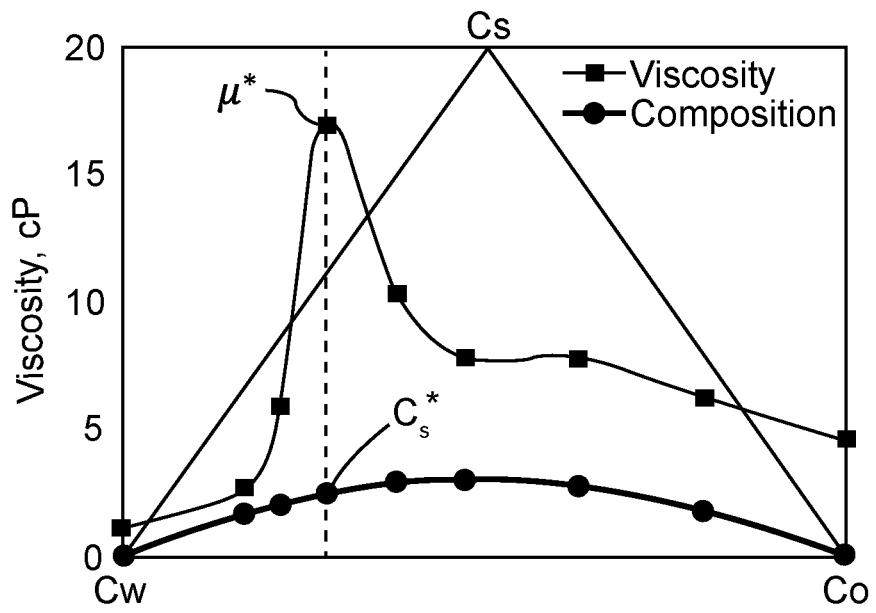
FIG. 4A is a graph illustrating the viscosity versus phase composition for a microemulsion according to an embodiment.

The microemulsion formed from mixing the injected water slugs with oil in the subsurface reservoir should be sufficiently viscous so that the microemulsion slows/diverts the front of the water injected following the water slug injection. Specifically, referring to FIG. 4A, a Winsor Type I microemulsion has a peak viscosity $\mu^*$, which corresponds to a microemulsion having a concentration of $C_s^*$ of the surfactant. However, the peak viscosity $\mu^*$ is too viscous to travel sufficiently into and across the high permeability layer to achieve the desired conformance improvement. Accordingly, the water slugs injected into the subsurface reservoir should each have a viscosity that is less than the peak viscosity $\mu^*$ but are sufficiently viscous so that the water slugs combine with each other and with oil in the subsurface reservoir to form the microemulsion having the peak viscosity $\mu^*$. Although the example of FIG. 4A relates to a peak of a Winsor Type I microemulsion, it should be recognized that other types of microemulsions exhibit similar viscosity peak behavior.

Figure 4B:
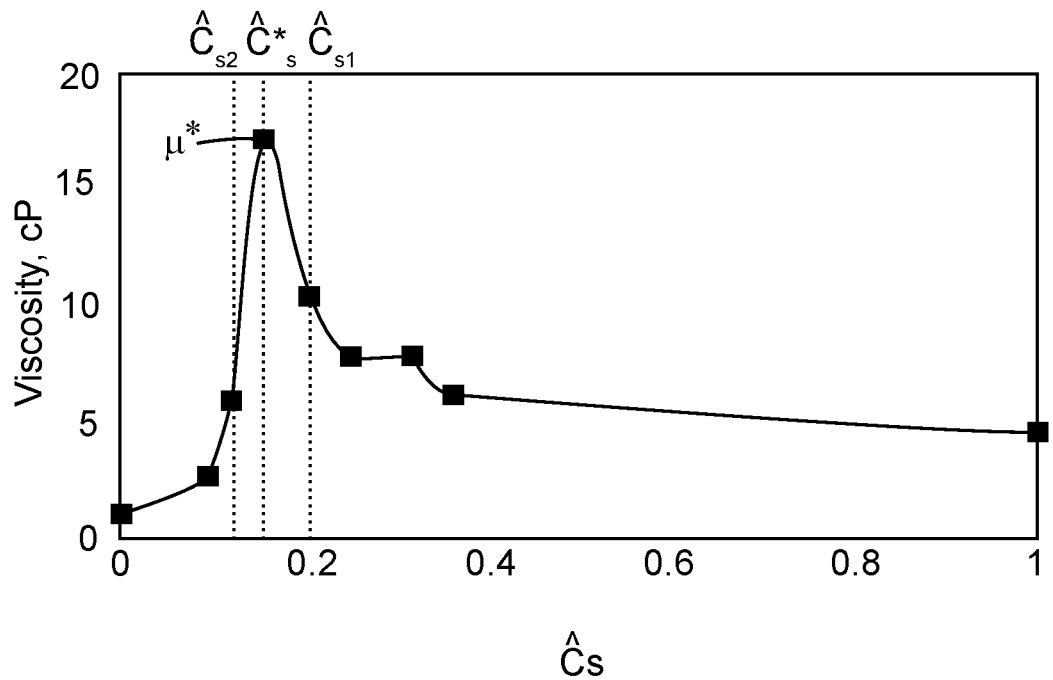
FIG. 4B is a graph illustrating the viscosity versus surfactant composition according to an embodiment.

In order to ensure the emulsion formed from the first and second water slugs propagates sufficiently far enough into the high permeability layer, it is desirable for the first and second water slugs to have a lower viscosity than the emulsion formed from mixing of the water slugs. The selection of the viscosity of the first and second water slugs will be discussed in connection with the graph of FIG. 4B, which is a plot of the viscosity cP (y-axis) versus the surfactant composition $\hat{C}s$ (x-axis) for a particular surfactant. The water slug represented in the graph include a TRS 10-80 petroleum sulfonate surfactant, a $C_{10}$-$C_{14}$ paraffinic oil, and a sodium chloride brine. The surfactant composition $\hat{C}s$ corresponds to the amount of surfactant versus water in the composition. As illustrated in FIG. 4B, the surfactant has a peak viscosity at a particular composition $\hat{C}_s{}^*$. Although the composition at this peak viscosity would perform well as a conformance improvement, it is much too viscous to propagate sufficiently far enough into the high permeability layer to be effective. Accordingly, in an embodiment, the viscosities of the first and second water slugs are selected from compositions to the left and right of this peak, so they are less viscous than the final desired viscosity and can propagate sufficiently into the high permeability layer. For the surfactant illustrated in FIG. 4B, viscosities to the left of the peak are achieved by decreasing the amount of surfactant relative to the water and viscosities to the right of the peak are achieved by increasing the amount of surfactant relative to the water.

Figure 4C:
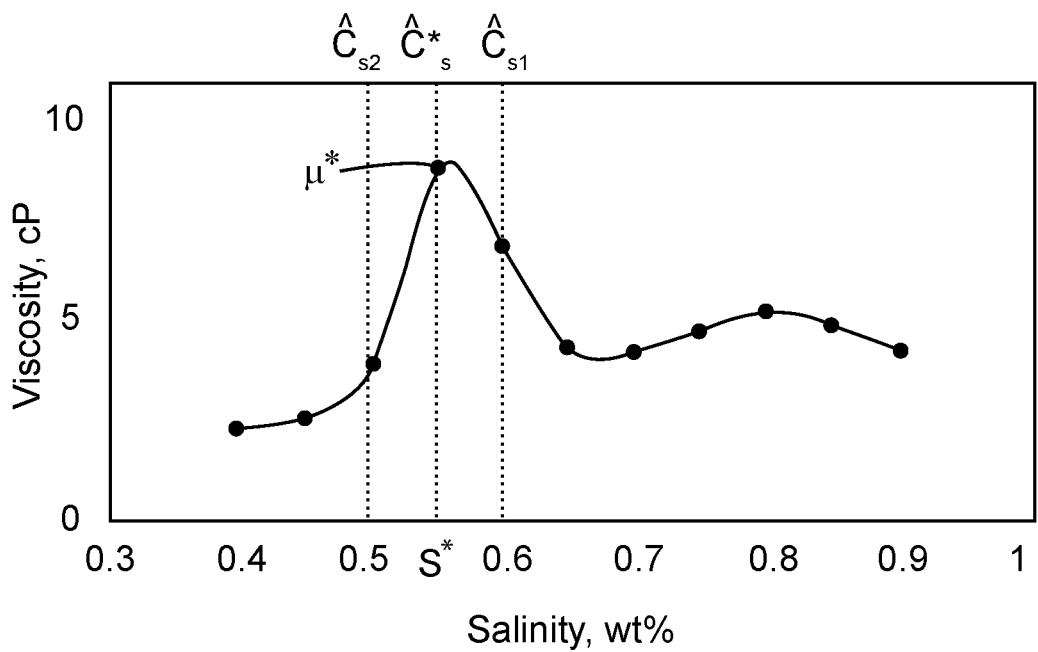
FIG. 4C is a graph illustrating the viscosity versus salinity according to an embodiment.

In addition to adjusting the water-surfactant composition of the individual water slugs so that when the water slugs are combined with each other and with oil to form a microemulsion having a higher viscosity than the individual water slugs, the same effect can be achieved by adjusting the salinity of the aqueous phase of the water slugs, an example of which is illustrated in FIG. 4C. As salinity of the water slugs decrease, the microemulsion formed with the oil tends towards a water-rich composition, and as the salinity increases, the microemulsion formed with the oil tends towards an oil-rich microemulsion.

As illustrated in FIG. 4C, a surfactant-water composition exhibits a peak viscosity $\mu^*$ at a particular amount of salinity $S^*$. Similar to the discussion above, the viscosities of the first and second water slugs are selected from compositions to the left and right of this peak, so they are less viscous than the final desired viscosity and can propagate sufficiently into the high permeability layer. For the surfactant illustrated in FIG. 4C, viscosities to the left of the peak are achieved by decreasing the salinity of the surfactant and viscosities to the right of the peak are achieved by increasing the salinity of the surfactant.

To ensure proper mixing of the first and second water slugs, the first water slug should have a composition $\hat{C}_{s1}$ that is more viscous than the composition $\hat{C}_{s2}$ of the second water slug, so that the second water slug can catch-up to the first water slug and mix with it to form the microemulsion in situ. In the embodiment in which the composition of the water slugs is varied between the first and second water slugs, the differing viscosities are achieved by controlling the surfactant-water ratio. In the embodiment in which the composition and salinity of the water slugs is varied between the first and second water slugs, the differing viscosities are achieved by adjusting the salinity of the water slugs, which in turn also adjusts the composition of the water slugs. With respect to the salinity adjustments, the surfactant concentration $\hat{C}_{s1}$ of the first water slug should be a concentration such that once the water slug is in contact with the reservoir oil, the surfactant is above the critical micelle concentration (cmc) to ensure the formation of the microemulsion once it is mixed with the oil. Further, with respect to the salinity adjustments, the surfactant concentration $\hat{C}_{s2}$ of the second water slug should be less than the surfactant concentration $\hat{C}_{s1}$ of the first water slug. In an embodiment, the second water slug can have no surfactant so long as the first water slug has a sufficient concentration of surfactant to ensure that the combined surfactant is above the critical micelle concentration.

Although FIGS. 4B and 4C illustrate plots for particular surfactants, it should be recognized that other types of surfactants exhibit similar peaks, and accordingly for these other types of surfactants, the viscosities of the first and second water slugs can be selected from compositions to the left and right of the corresponding peak.

According to an embodiment, the compositions $\hat{C}_{s1}$ and $\hat{C}_{s2}$ of the first and second water slugs, respectively, can be selected to satisfy three criteria. The first criteria is that that corresponding viscosities of the compositions of the first and second water slugs (i.e., $\mu_1=\mu(\hat{C}_{s1})$ and $\mu_2=\mu(\hat{C}_{s2})$) are below a viscosity limit $\mu_{max}$, which preserves injectivity of the water slugs. In an embodiment, the viscosity limit $\mu_{max}$ corresponds to the viscosity $\mu^*$ at the peak of the surfactant compositions illustrated in FIGS. 4A and 4B. The second criteria is that the two water slugs mix into an intermediate composition $\hat{C}_s{}^*$ (i.e., $\hat{C}_{s2}<\hat{C}_s{}^*<\hat{C}_{s1}$) having a corresponding viscosity $\mu^*=\mu(\hat{C}_s{}^*)$ that is higher than the viscosity limit $\mu_{max}$. The third criteria, which was discussed above, is that the viscosity of the first water slug $\mu_1$ is greater than the viscosity of the second water slug $\mu_2$ (i.e., $\mu_1>\mu_2$) so that the second water slug contacts the first water slug to form a mixed composition $\hat{C}_s{}^*$ of the two different compositions $\hat{C}_{s1}$ and $\hat{C}_{s2}$. As discussed above, as an alternative, or in addition to, to using surfactants having different compositions, the water slugs can have different levels of salinity.

Figure 5A:
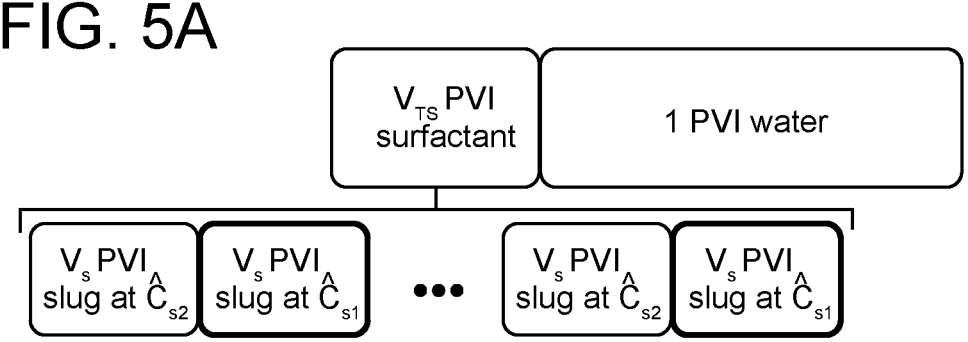
FIG. 5A is a schematic diagram of a method of conformance improvement using cycles of water slugs according to an embodiment.
Figure 5B:
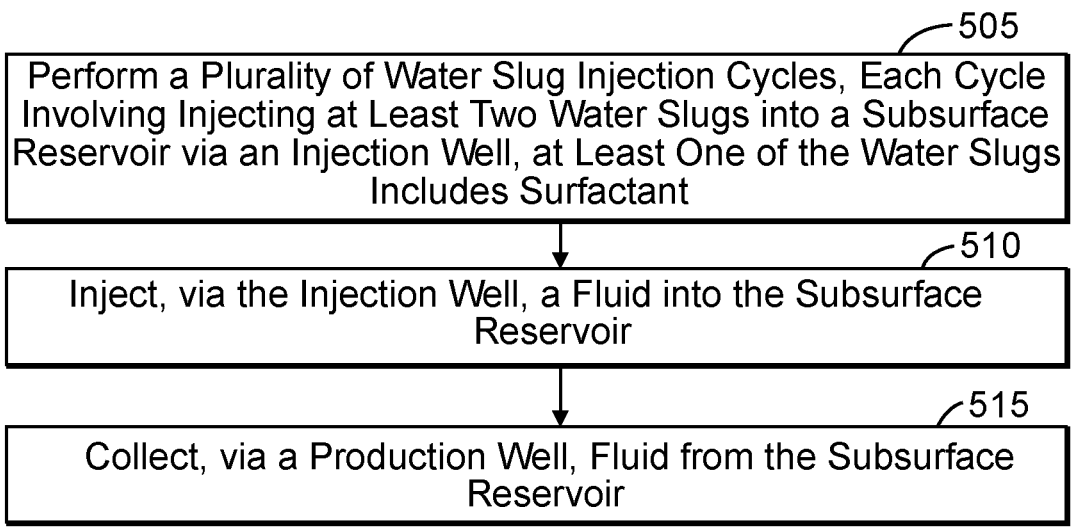
FIG. 5B is a flowchart of a method of conformance improvement according to an embodiment.

Although the discussion above involves an embodiment that injects first and second water slugs, the conformance improvement can be optimized by employing several cycles of first and second water slugs satisfying the three criteria set forth above, an example of which is illustrated in FIGS. 5A and 5B. This can involve performing a plurality of water slug injection cycles, each cycle involving injecting at least two water slugs into a subsurface reservoir via an injection well (step 505). The at least two water slugs of each cycle combine with oil in the subsurface reservoir to form a microemulsion in a layer of the subsurface reservoir. A fluid is then injected, via the injection well, into the subsurface reservoir (step 510), and finally fluid from the reservoir is collected via a production well, where the injected fluid causes the oil to move into the production well (step 515). In an embodiment, the injected fluid can be water and the collected fluid can be oil and water. The composition of the first and second water slugs can be constant across all cycles or can vary. For example, the composition of the first water slug varies each cycle and the composition of the second water slug is constant across all cycles, and vice-versa; the composition of both the first and second water slugs can vary across all cycles; or the composition of one or both of the first and second water slugs varies some but not all cycles.

As illustrated in FIG. 5A, the total amount of the first and second water slugs of the all of the cycles equals $V_{TS}$ pore volume injected (PVI). Those skilled in the art will recognize that PVI corresponds to the total volume of pores in the subsurface reservoir between the injection and production wells. Thus, the injected volume of each water slug Vs can be calculated as follows:

$$V_s = \frac{V_{TS}}{2N}, \quad (1)$$

where N is the number of cycles. After $V_{TS}$ PVI of surfactant is injected, 1 PVI of water can be injected to move the oil in the subsurface reservoir towards the production well. Amounts other than 1 PVI of water can be injected to move the oil towards the production well. Further, 1 PVI of water, or any other amount, can be injected prior to injecting the water slugs (i.e., either the first and second water slugs or the cycles of water slugs).

Figure 6:
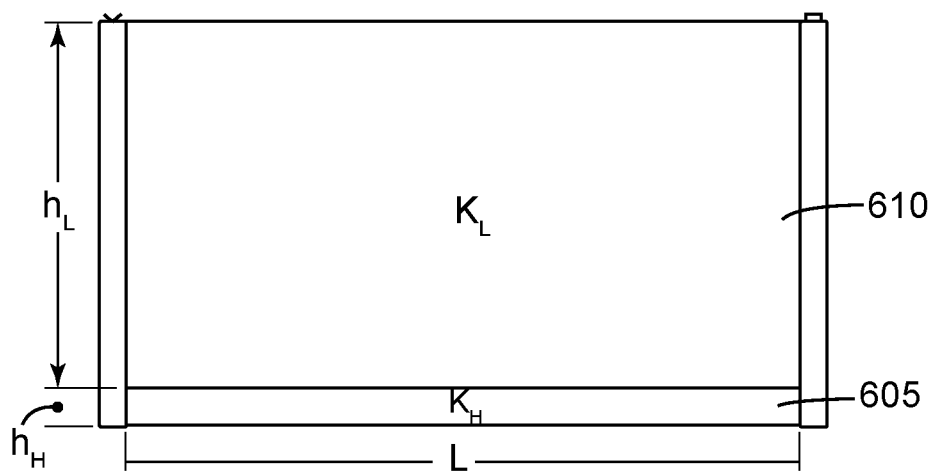
FIG. 6 is a schematic diagram of a two-layer system used for simulation of the disclosed conformance improvement method of FIGS. 5A and 5B according to an embodiment.

A sensitivity analysis of the effect of the disclosed conformance improvement was performed using a two-dimensional vertical simulation based on the two-layer system illustrated in FIG. 6, where the lower layer 605 has a higher permeability than the upper layer 610.

In FIG. 6, $h_L$ is the vertical height of the low permeability layer 610, $K_L$ is the permeability of the low permeability layer 610, $h_H$ is the vertical height of the high permeability layer 605, $K_H$ is the permeability of the high permeability layer 605, and L is the length between the injection and production wells. The relevant properties for this analysis include the aspect ratio ($L/(h_H+h_L)$), the ratio of the high-permeability layer thickness to the total reservoir thickness ($h_H/(h_H+h_L)$), and the ratio of high to low permeabilities ($K_H/H_L$). The concentrations and viscosities for the simulation are as follows:

TABLE 1

| $\hat{C}_{s1}$ | $\hat{C}_s^*$ | $\hat{C}_{s2}$ |
|---|---|---|
| 0.25 | 0.16 | 0.12 |
| $\mu_1$, cP | $\mu^*$, cP | $\mu_2$, cP |
| 7.8 | 17.2 | 5.9 |

The sensitivity analysis was performed using the following process parameters in which the indicated pore volumes refer to the pore volumes of the high permeability layer and the high permeability layer accounts for 0.1 total reservoir pore volume (i.e., 10% of the reservoir).

TABLE 2

| Case | | $V_{TS}$ | $L/(h_H + h_L)$ | $h_H/(h_H + h_L)$ | $K_H/K_L$ |
|---|---|---|---|---|---|
| Reference | | 0.5 | 10 | 0.1 | 50 |
| $V_{TS}$ | High | 0.75 | 10 | 0.1 | 50 |
| | Low | 0.25 | | | |
| $L/(h_H + h_L)$ | High | 0.5 | 20 | 0.1 | 50 |
| | Low | | 1 | | |
| $h_H/(h_H + h_L)$ | High | 0.5 | 1 | 0.5 | 50 |
| | Low | | | 0.05 | |
| $K_H/K_L$ | High | 0.5 | 1 | 0.1 | 10 |
| | Low | | | | 100 |

Figure 7A:
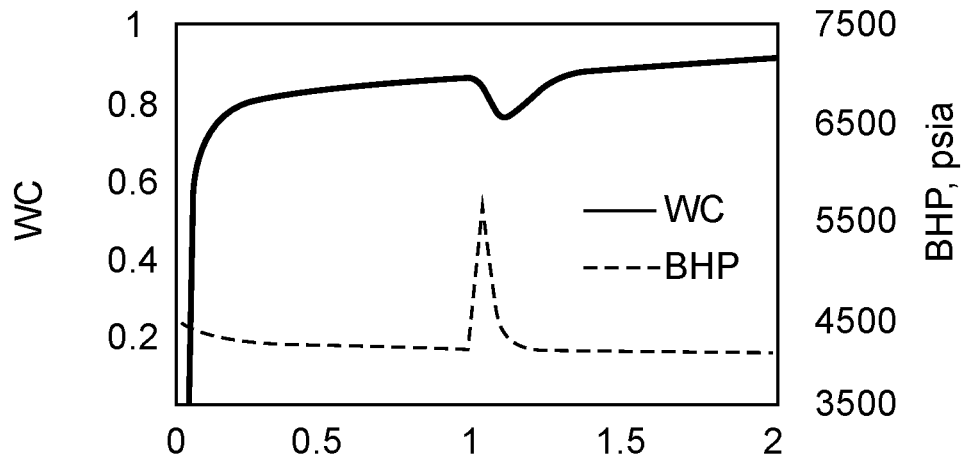
FIGS. 7A-7C are graphs illustrating the water cut and bottomhole pressure for three different amounts of total injected water slug volume according to embodiments.

The effect of the reference case with $V_{TS}$=0.5 PVI on the water cut and bottomhole pressure is illustrated in FIG. 7A. As illustrated, after the water slugs were injected, the water cut increased by over 10% and the bottomhole pressure increased by almost 1200 psia. The impact on reducing the water cut was longer lasting (0.33 PVI) than the impact on the increased bottomhole pressure (0.23 PVI) even though the water slug volume injected was considerably smaller (0.05 PVI). The reason for this is that the high-viscosity solution forms in the high permeability layer and the injected fluid diverts to the low permeability layer 610, which indicates that oil from the low permeability layer is being produced (i.e., decreasing water cut) and the injectivity for the displacement process decreases (i.e., increasing bottomhole pressure).

Figure 7B:
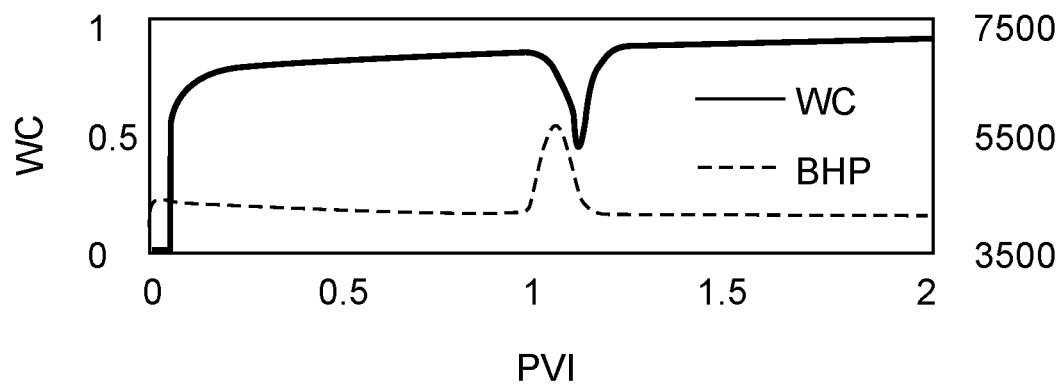
Figure 7C:
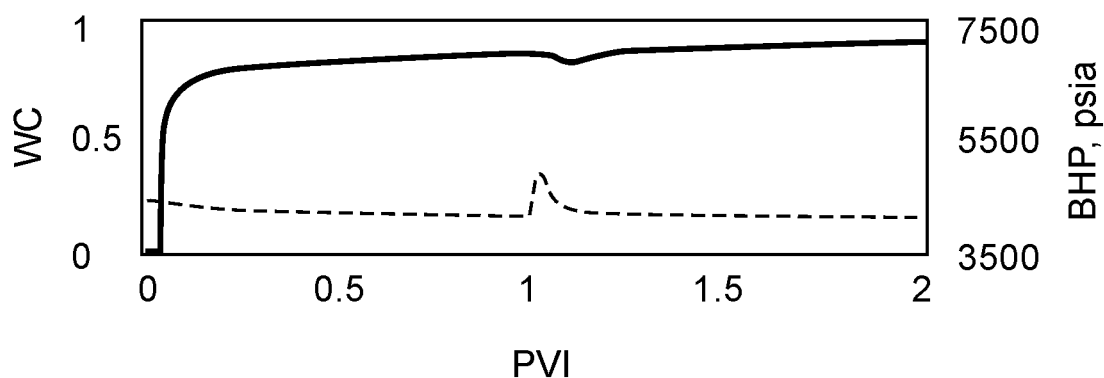

FIGS. 7B and 7C illustrate the water cut and bottomhole pressure having the same parameters as in FIG. 7A except for the water slug injection volumes are 0.75 (FIG. 7B) and 0.25 (FIG. 7C) PVI of the high permeability layer 605. As illustrated in FIG. 7B, using a water slug injection volume of 0.75 PVI of the high permeability layer 605 decreased the water cut by 41% and increased the bottomhole pressure by 1600 psia compared to the reference case illustrated in FIG. 7A. In contrast, as illustrated in FIG. 7C, using a water slug injection volume of 0.25 PVI of the high permeability layer 605 decreased water cut by only 4% and increased bottomhole pressure by 900 psia compared to the reference case illustrated in FIG. 7A. This demonstrates that increasing the volume of the injected water-surfactant slug increases the favorable response of both water cut (i.e., decreased water cut) and bottomhole pressure (i.e., increased bottomhole pressure).

Referring again to Table 2, with respect to the changing of the reservoir aspect ratio (i.e., $L/(h_H+h_L)$), a high aspect ratio of 20 decreased water cut by 9% and increased bottomhole pressure by approximately 2400 psia compared to the reference case of an aspect ratio of 10, whereas a low aspect ratio of 1 decreased water cut by 27% and increased bottomhole pressure by approximately 200 psia compared to the reference case of an aspect ratio of 10. This demonstrates that as the spacing increases, the conformance improvement method becomes less effective at decreasing water cut because the water flood following the water slug injection is able to bypass the viscous water slug, whereas the bottomhole pressure response reaches a steady state faster as the spacing decreases.

With respect to changing the thickness ratio of the high permeability layer 605 compared to the total thickness (i.e., $h_H/(h_H+h_L)$), a high thickness ratio of 0.5 decreased water cut by 45% and increased bottomhole pressure by approximately 600 psia compared to the reference case of a thickness ratio of 0.1, whereas a low thickness ratio of 0.05 decreased water cut by 6% and increased bottomhole pressure by approximately 14000 psia compared to the reference case of a thickness ratio of 0.1. This indicates that as the thickness ratio increases, the high permeability layer 605 contributes more to the water cut, which explains why the impact is so pronounced for the high thickness ratio case of 0.5, while increasing the thickness ratio causes the reservoir average permeability, which lowers the bottomhole pressure.

With respect to changing the permeability contrast (i.e., $K_H/K_L$), a high permeability contrast of 100 decreased water cut by 31% and increased bottomhole pressure by approximately 900 psia compared to the reference case of permeability contrast of 50, whereas for a low permeability contrast of 10 the water cut was not impacted and the bottomhole pressure increased by 2300 psia compared to the reference case of permeability contrast of 50. This demonstrates that as permeability contrast decreases, the reservoir becomes more homogeneous, causing the injected water slug to treat all areas equally that results in higher bottomhole pressure. For the low permeability contrast case of 10, the leading water front, which is injected before the water slug injection, had completely broken through in both high 605 and low 610 permeability layers before starting water slug injection, which explains the water cut insensitivity to the treatment (i.e., crossflow is no longer a relevant mechanism).

Simulations were also performed using a modification of the Upper Ness formation described in "Tenth SPE Comparative Solution Project: A Comparison of Upscaling Techniques", SPE Reservoir Simulation Symposium. Society of Petroleum Engineers by Christie, M. A., & Blunt, M. J. (2001). This provides a more heterogeneous representation of contrasting geological features. The modification involves of taking a 2D vertical layer and assigning the top half of the layer an average permeability of 100 mD and the bottom half of the layer 10000 mD through appropriate permeability multipliers, while keeping the local permeability heterogeneity within the layer. The reservoir was discretized using grid block dimensions of 3 m×6 m×0.6 m, for a total of 220×1×50 grid blocks, and the disclosed conformance improvement methods illustrated in FIGS. 5A and 5B were employed. The incremental recovery factor (IRF) for the low permeability layer was 2.4% and 8.9% for the high permeability layer. This demonstrates the effectiveness of the disclosed conformance improvement in diverting flow into the low permeability layer in the presence of local heterogeneity in a two-layer system. The generated viscosity maps corresponding to the water slug injection every 0.05 PVI showed that as fluids mix in the reservoir, multiple contacts are formed of composition $\hat{C}_s^*$, which significantly reduce the mobility of the high permeability layer. The simulation demonstrated a decrease in water cut of 36% and an increase in bottomhole pressure of approximately 600 psia due to the disclosed conformance improvement.

Finally, based on the reference case in Table 2, sensitivity on Dykstra-Parsons coefficient for a 10-layer system, with multiple high permeability layers, was evaluated using the disclosed conformance improvement method. This evaluation demonstrated the effectiveness of the disclosed conformance improvement method for many-layered systems and its effectiveness in inducting crossflow to improve oil recovery.

Figure 8:
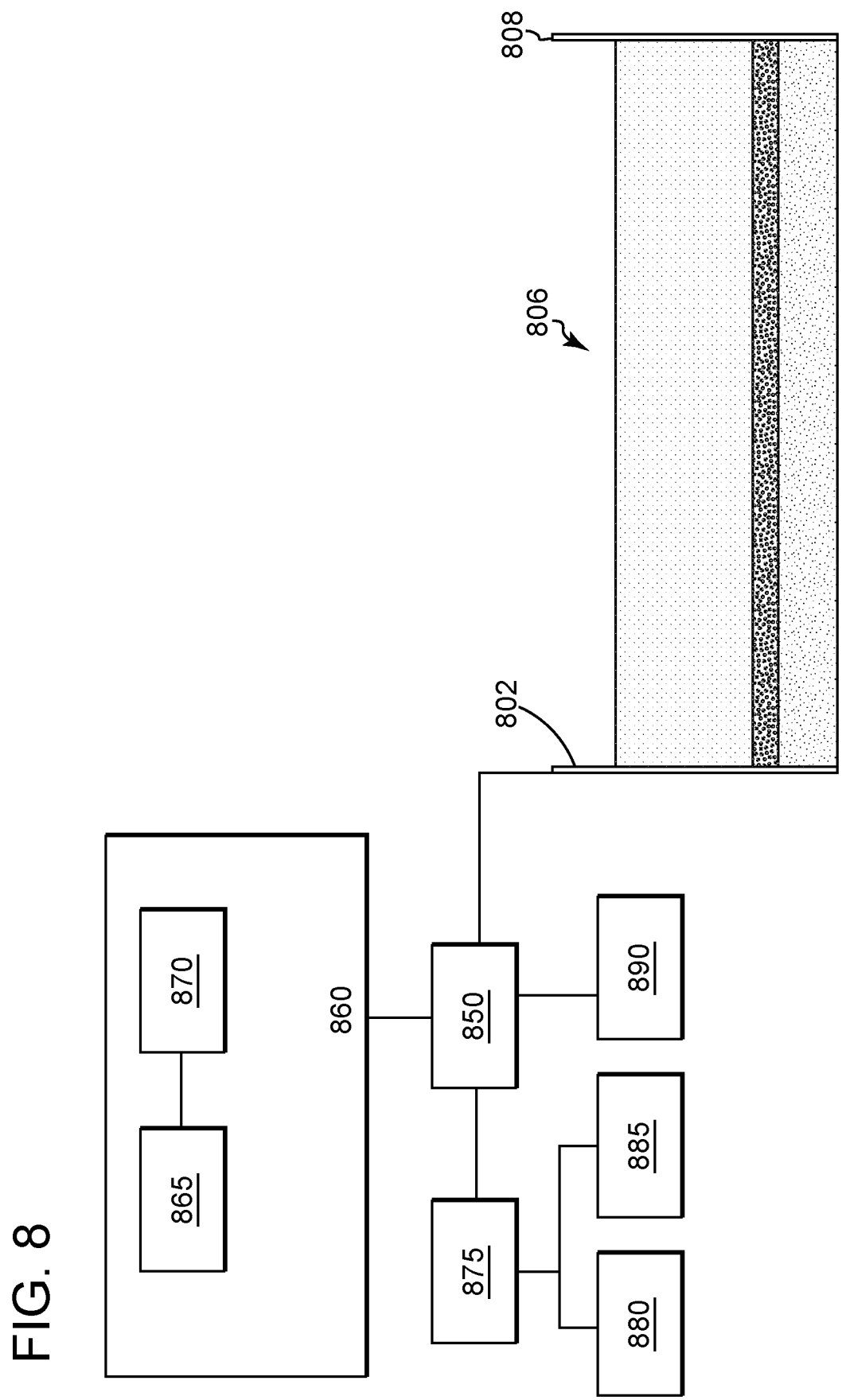
FIG. 8 is a schematic diagram of a system for performing the disclosure conformance improvement method according to an embodiment.

FIG. 8 is a schematic diagram of a system for performing the disclosure conformance improvement method according to an embodiment. The system includes a pump 850 coupled a subsurface reservoir 806 via an injection well 802, and a controller 860 coupled to the pump 850. The controller 860 can be any type of controller, including a computer, an application specific integrated circuit (ASIC), field programmable gate array (FPGA), or any other type of controller. If the controller 860 is a computer, the controller 860 includes a processor 865 coupled to a memory 870. The memory 870 contains program instructions that are loaded into processor 865 to perform any of the disclosed conformance improvement methods. Thus, in one embodiment, the controller 860 is configured to control the pump 850 to inject, via the injection well 802, a first water slug into the subsurface reservoir 806. The controller 860 is also configured to control the pump 850 to inject, via the injection well 802, a second water slug into the subsurface reservoir 806. The first and second water slugs have different viscosities and the first and second water slugs combine with oil in the subsurface reservoir to form a microemulsion in a layer of the subsurface reservoir. The controller 860 is also configured to control the pump 850 to inject, via the injection well 802, a fluid into the subsurface reservoir 806. The controller 860 can also be configured to control the pump 850 so that is performs a number of cycles of the injections of the first and second water slugs prior to the injection of the fluid, consistent with the discussion above in connection with FIGS. 5A and 5B.

The system can also include a mixer 875 coupled between the pump 850 and first 880 and second 885 containers. One of the first 880 and second 885 containers can hold a surfactant and the other of the first 880 and second 885 containers can hold a saline solution that can be mixed with the surfactant by mixer 875. Alternatively, the first 880 and second 885 containers can each hold a surfactant having a different composition, in which case the mixer 875 can be omitted. Although FIG. 8 illustrates the pump 850 and mixer 875 being separate components, the mixer 875 can be integrated into the pump 850. In another embodiment, one of the first 880 and second 885 containers can hold a surfactant and the other of the first 880 and second 885 containers can hold water, the two of which can be mixed by mixer 875 to adjust the surfactant concentration.

The pump 850 is also coupled to a fluid source 890, such as water, used to flood the reservoir 806. The system can also include a production well 808 from which the desired fluid, such as oil, is extracted from the subsurface reservoir 806.

The disclosed embodiments provide a system and method for oil reservoir conformance improvement. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, comprising:
   injecting, via an injection well, a first water slug into a subsurface reservoir;
   injecting, via the injection well, a second water slug into the subsurface reservoir, wherein the first and second water slugs have different viscosities, the first water slug includes a surfactant that has a concentration above a critical micelle concentration, wherein, after injecting, the first and second water slugs combine with oil in the subsurface reservoir to form a microemulsion having a peak viscosity, in a layer of the subsurface reservoir;
   injecting, via the injection well, a fluid into the subsurface reservoir, wherein the microemulsion slows a movement of the fluid through the layer due to the peak viscosity; and
   collecting, via a production well, oil from the subsurface reservoir wherein the injected fluid causes the oil to move into the production well,
   wherein each of a first viscosity of the first water slug and a second viscosity of the second water slug is selected to be smaller than the peak viscosity of the microemulsion, and
   wherein the peak viscosity is characterized by a corresponding concentration of the surfactant, the first water slug has a larger concentration of the surfactant than the corresponding concentration of the surfactant of the microemulsion, and the second water slug has a smaller concentration of the surfactant than the corresponding concentration of the surfactant of the microemulsion.

2. The method of claim 1, wherein the first and second water slugs have different concentrations of surfactants.

3. The method of claim 2, wherein the first and second water slugs have different levels of salinity.

4. The method of claim 1, wherein the first water slug is more viscous than the second water slug.

5. The method of claim 1, wherein prior to injecting the fluid into the subsurface reservoir, the method comprising:
injecting, via the injection well, a third water slug into the subsurface reservoir; and
injecting, via the injection well, a fourth water slug into the subsurface reservoir, wherein the third and fourth water slugs have different viscosities.

6. The method of claim 5, wherein the first and third water slugs have a same composition and the second and fourth water slugs have a same composition.

7. The method of claim 5, wherein the first and third water slugs have a different composition and the second and fourth water slugs have a different composition.

8. The method of claim 1, wherein the subsurface reservoir includes at least the layer and an additional layer, wherein the layer is more permeable than the additional layer.

9. A method comprising:
injecting, via an injection well, a first water slug into a subsurface reservoir;
injecting, via the injection well, a second water slug into the subsurface reservoir, wherein the first and second water slugs have different viscosities, the first water slug includes a surfactant that has a concentration above a critical micelle concentration, wherein, after injecting, the first and second water slugs combine with oil in the subsurface reservoir to form a microemulsion having a peak viscosity, in a layer of the subsurface reservoir;
injecting, via the injection well, a fluid into the subsurface reservoir, wherein the microemulsion slows a movement of the fluid through the layer due to the peak viscosity; and
collecting, via a production well, oil from the subsurface reservoir wherein the injected fluid causes the oil to move into the production well,
wherein each of a first viscosity of the first water slug and a second viscosity of the second water slug is selected to be smaller than the peak viscosity of the microemulsion, and
wherein the peak viscosity is characterized by a corresponding salinity, the first water slug is selected to have a larger salinity than the microemulsion, and the second water slug is selected to have a smaller salinity than the microemulsion.

* * * * *